(12) United States Patent
Green

(10) Patent No.: US 7,730,909 B1
(45) Date of Patent: Jun. 8, 2010

(54) ACCESSORY FOR A VAPOR GENERATOR

(76) Inventor: Jay B. Green, 8732 Deerland Grove, Raleigh, NC (US) 27615

( * ) Notice: Subject to any disclaimer, the term of this patent is extended or adjusted under 35 U.S.C. 154(b) by 94 days.

(21) Appl. No.: 11/952,187

(22) Filed: Dec. 7, 2007

(51) Int. Cl.
*F16L 9/00* (2006.01)
*B05B 1/24* (2006.01)
(52) U.S. Cl. ........................ 138/177; 138/178; 138/109; 138/155; 239/548; 239/568; 239/136; 251/149.1
(58) Field of Classification Search ................ 138/177, 138/178, 109, 155; 239/14.1, 266, 269, 548; 239/566, 568, 136; 392/397, 398
See application file for complete search history.

(56) References Cited

U.S. PATENT DOCUMENTS

| | | | | |
|---|---|---|---|---|
| 1,484,575 A | * | 2/1924 | Shulin | 239/602 |
| 2,070,038 A | * | 2/1937 | Batt | 516/6 |
| 2,771,320 A | * | 11/1956 | Korwin | 239/279 |
| 3,715,099 A | * | 2/1973 | Shendure | 251/149.1 |
| 3,727,841 A | * | 4/1973 | Hengesbach | 239/145 |
| 4,162,041 A | * | 7/1979 | Hane | 239/266 |
| 4,899,940 A | * | 2/1990 | Leaver | 239/526 |
| 4,925,099 A | * | 5/1990 | Owen | 239/289 |
| 5,121,882 A | * | 6/1992 | Skidmore | 239/269 |
| 5,964,419 A | * | 10/1999 | Lovett | 239/532 |
| 6,065,693 A | * | 5/2000 | Lukas | 239/548 |
| 6,189,805 B1 | * | 2/2001 | West et al. | 239/74 |
| 6,276,399 B1 | * | 8/2001 | Fox | 138/109 |

FOREIGN PATENT DOCUMENTS

BR        9900221 A   *  8/2000

* cited by examiner

*Primary Examiner*—Patrick F Brinson
(74) *Attorney, Agent, or Firm*—Coats & Bennett, P.L.L.C.

(57) ABSTRACT

An accessory for a vapor generator, such as a smoke or fog machine, includes an elongated member that connects to an output nozzle of the vapor generator. The elongated member has one or more perforations formed in its sidewall along its length. A vapor generated by the vapor generator travels through an interior of the elongated member and escapes through the perforations to the ambient atmosphere. The effect creates a curtain of smoke or fog.

15 Claims, 3 Drawing Sheets

ACCESSORY FOR A VAPOR GENERATOR

FIELD OF THE INVENTION

The present invention relates generally to accessory devices for vapor generators.

BACKGROUND

Many different types of devices are able to generate a theatrical vapor. For example, one type of vapor generator is a smoke machine. Most smoke machines typically vaporize a water and glycol-based fluid mixture to emit a dense vapor that resembles smoke or fog. In operation, the smoke machine injects the fluid into a heated block or chamber where it quickly evaporates into a vapor. The resultant pressure forces the vapor out of the chamber and into the cooler ambient air, where it forms a fog or smoke.

There are many different uses for such devices. For example, the entertainment industry uses smoke machines to create spooky theatrical effects, or to enhance lighting effects. Smoke machines are also useful for industrial purposes, such as visualizing the flow of air in a wind tunnel. Additionally, smoke machines are frequently used in commercial Halloween displays, and have become widely used for domestic Halloween decorations in residential areas.

SUMMARY

The present invention provides an accessory for a machine that generates a vapor, such as a smoke or fog machine. In one embodiment, the accessory comprises an elongated member such as a hose, for example, that connects to an output nozzle of a smoke machine. The elongated member is capped at the opposite end, and includes a plurality of perforations formed along its length. Smoke generated by the smoke machine travels through the elongated member and escapes through the perforations to create a curtain of smoke.

DETAILED DESCRIPTION

The present invention comprises an accessory for a machine that generates a vapor, such as a smoke or fog machine. The accessory attaches to an outlet nozzle on the machine and receives the generated vapor. The vapor travels through the accessory, and escapes through a plurality of perforations formed in the accessory. The escaping vapor forms a curtain of fog or smoke that is useful for any of a variety of theatrical purposes, for example.

Figure 1:
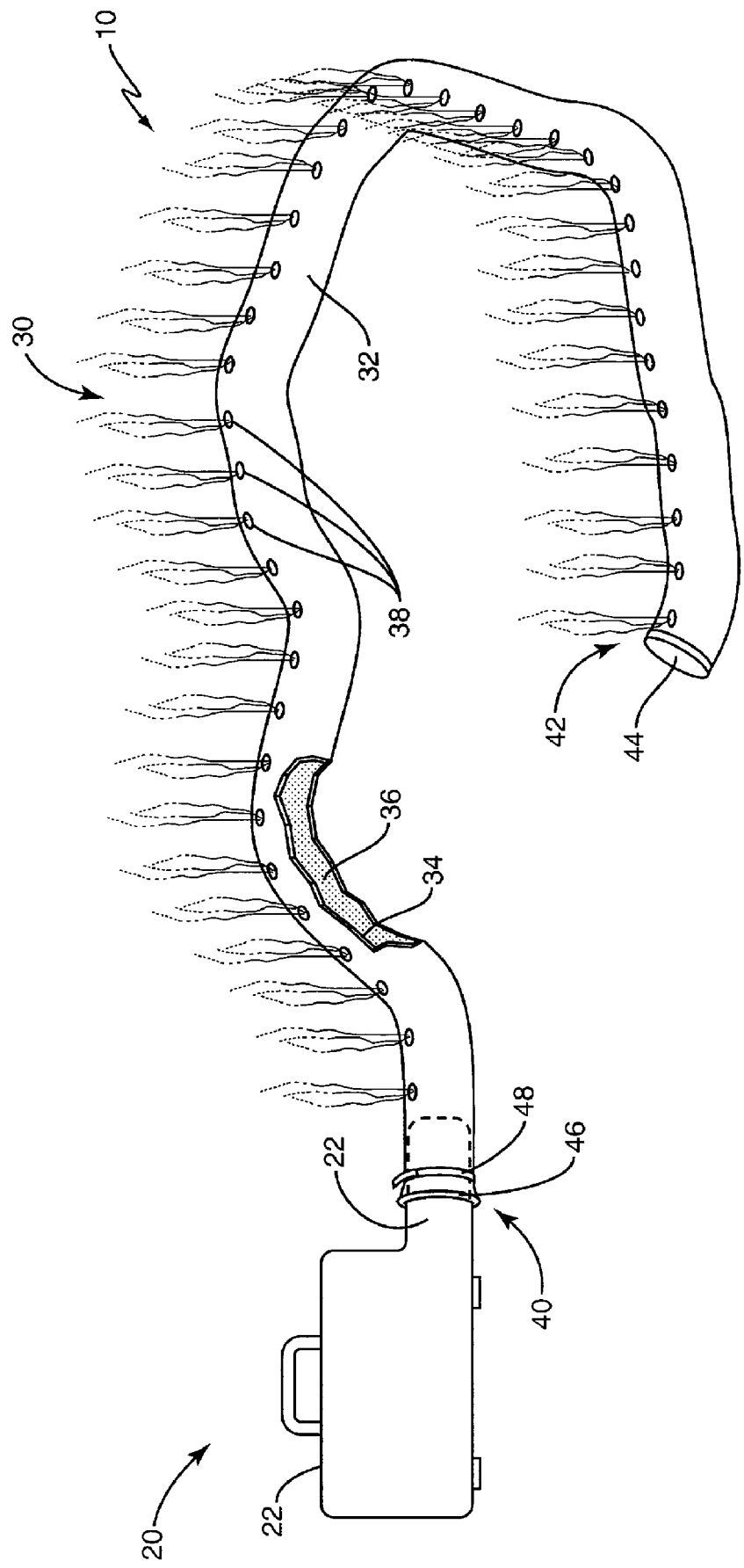
FIG. 1 illustrates one embodiment of the present invention.

FIG. 1 illustrates one embodiment of a vapor generating system 10 comprising a smoke machine 20 and an accessory 30 configured according to one embodiment of the present invention. Smoke machine 20 may be any smoke machine known in the art. In one embodiment, however, smoke machine 20 uses a water and glycol-based fluid mixture to generate a dense vapor that resembles smoke or fog. The details of how smoke machine 20 generates smoke using such a mixture are well-known in the art and not germane to the present invention. However, a brief description appears here for completeness.

Smoke machine 20 includes a housing 22 and an outlet nozzle 24. Typically, an operator fills a reservoir within the housing 22 with the water and glycol-based fluid mixture. In operation, a high-pressure pump injects the fluid mixture through a heat exchanger, which usually comprises a block of aluminum or other metal with a built-in heating element. The heat exchanger maintains a high temperature so that when the fluid mixture enters the heat exchanger, the fluid mixture quickly vaporizes in a process known as "flashing." The vaporized fluid mixture then rapidly expands to force the resultant vapor through the outlet nozzle 24. When the vapor contacts the cooler ambient air, it forms a dense smoke or fog.

Accessory 30 comprises an elongated flexible hose 32 having a sidewall 34 that defines an elongated interior chamber 36. A plurality of spaced-apart perforations 38 is disposed along the length of hose 32. The perforations 38 extend through the sidewall 34 of hose 32 and, as described later in more detail, allow a vapor within the chamber 36 to escape to the exterior of hose 32. A first end 40 of the hose 32 is open and includes a coupling member 46 to releasably attach hose 32 to an outlet nozzle 24 of smoke machine 20 using any method known in the art. For example, in the Figures, the coupling member 46 is formed by slightly enlarging the first end 40 to fit over the nozzle 24 of the smoke machine 20. The first end 40 can then be held in place by a clamp 48, or by any other fastener known in the art. Alternatively, the first end 40 and the nozzle 24 may be connected together by other types of couplings, as is described later in more detail. The opposite end of hose 42 terminates hose 32, and comprises a cap 44 that substantially seals the end of hose 32.

In operation, a user lays accessory 30 on the ground or other supporting surface and connects the hose 32 to the outlet nozzle 24. In this embodiment, the first end 40 of hose 32 is slightly enlarged to permit the user to slide the first end 40 of hose 32 over the outlet nozzle 24. A clamp 48 or other mechanical fastener is then used to secure the first end 40 and maintain the hose 32 in contact with the outlet nozzle 24.

The user may then operate smoke machine 20 to generate a vapor as previously described. The vapor exits the outlet nozzle 24 and enters the interior chamber 36 via the open end 40 of hose 32. The pressure created by the vaporization process in smoke machine 20 forces the vapor through the interior chamber 36 of hose 32. As the vapor moves through the interior chamber 36, it escapes through the perforations 38 into the ambient atmosphere. The result is a curtain or wall of smoke or fog emitted from accessory 30.

The present invention may, of course, be carried out in other ways than those specifically set forth herein without departing from essential characteristics of the invention. For example, as seen in FIG. 1, the perforations 38 are formed as through holes that extend through the sidewall 34 of hose 32.

Figure 2:
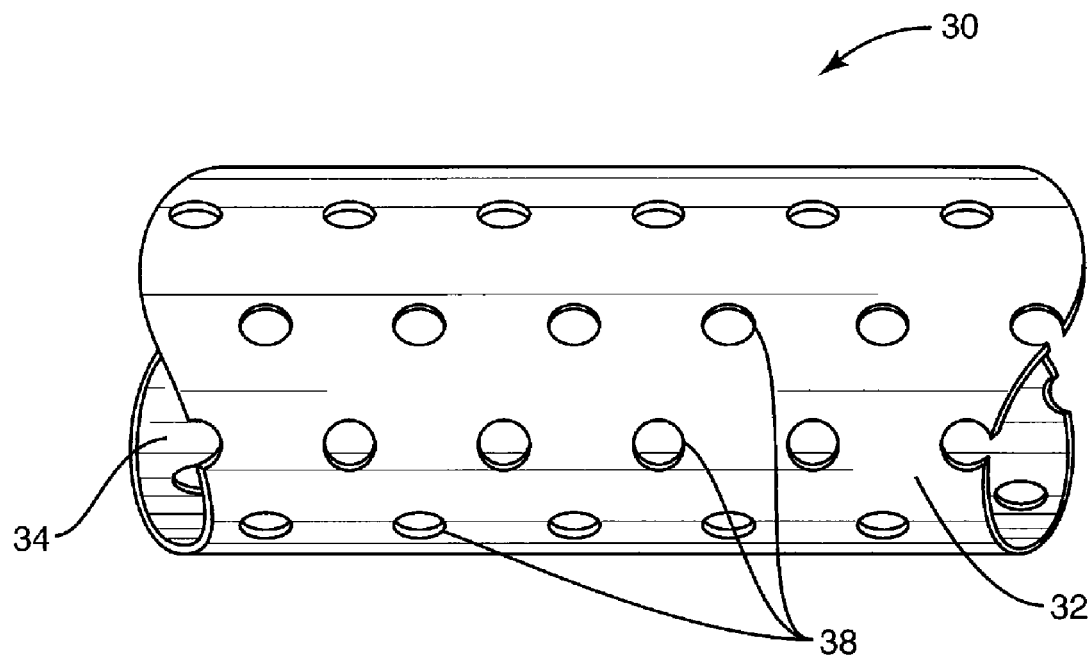
FIG. 2 illustrates another embodiment of the present invention.
Figure 3:
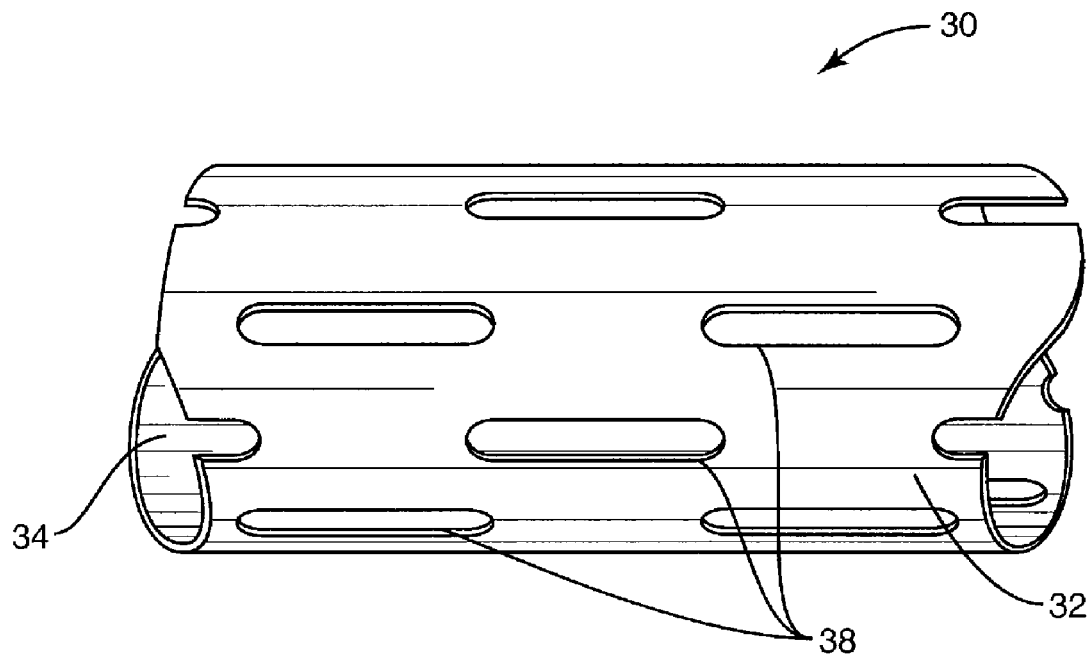
FIG. 3 illustrates another embodiment of the present invention.

The perforations 38 are generally aligned along the length of hose 32; however, there is no limitation regarding the size, shape, or arrangement of the perforations 38. Those skilled in the art will appreciate that the perforations 38 may be formed anywhere along hose 32 and in any desired pattern. For example, as seen in FIG. 2, the perforations 38 are formed around the circumference of the hose 32. With this pattern, vapor escapes through some of the perforations 38 to disperse as a curtain of smoke, and through other perforations 38 to disperse substantially along the supporting ground surface. FIG. 3 illustrates another embodiment wherein the perforations 38 are formed as elongated slits that extend through sidewall 34 of hose 32.

Additionally, there is no requirement that the hose 32 be laid on a ground surface. For example, hose 32 may be suspended such that it hangs substantially vertically or in any other desired orientation. Further, those skilled in the art will appreciate that the accessory 30 is not limited for use with a smoke machine. Accessory 30 may also be used with similar types of machines that generate fog or smoke. Such machines include, but are not limited to, fog machines and haze machines.

Figure 4:
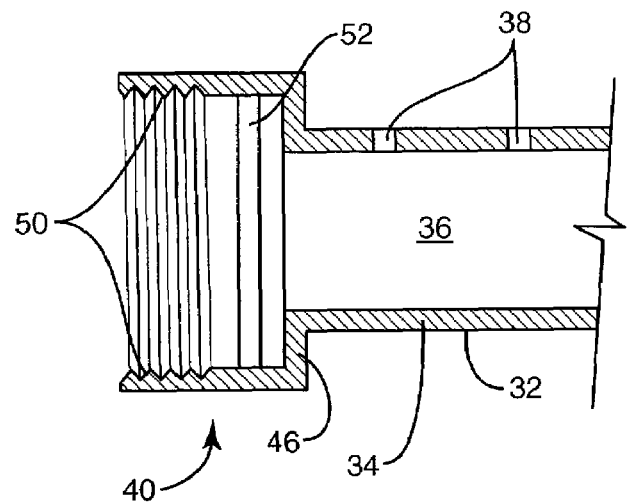
FIG. 4 illustrates one embodiment of a coupling that releasably couples one embodiment of the present invention to a vapor generator.

Further, the present invention also contemplates other ways by which to couple hose 32 to the outlet nozzle 24 other than those discussed above. FIG. 4, for example, illustrates another embodiment wherein the coupling member 46 comprises a cap having threads 50 formed on its interior. In use, the coupling member 46 would fit over the outlet nozzle 24, and the threads 50 would threadingly engage corresponding threads formed on the outlet nozzle 24. A seal 52, such as a rubber grommet, for example, might also be used to seal the coupling member 46 to the outlet nozzle 24 to prevent generated vapor from escaping.

Figure 5A:
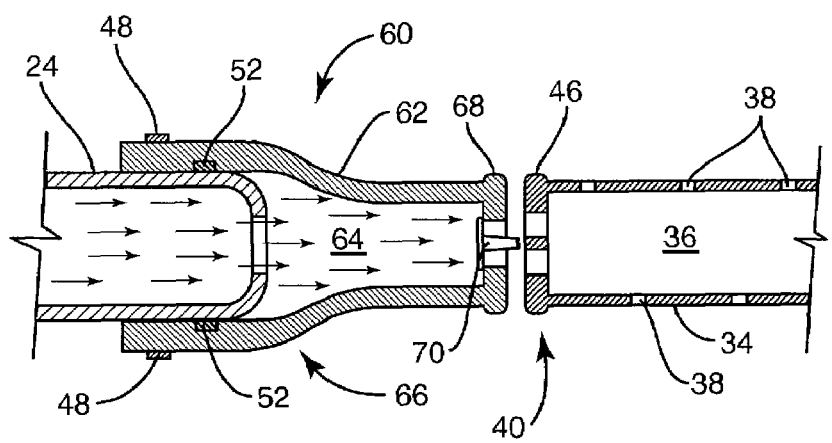
FIGS. 5A-5B illustrate another embodiment of a coupling that releasably connects one embodiment of the present invention to a vapor generator.
Figure 5B:
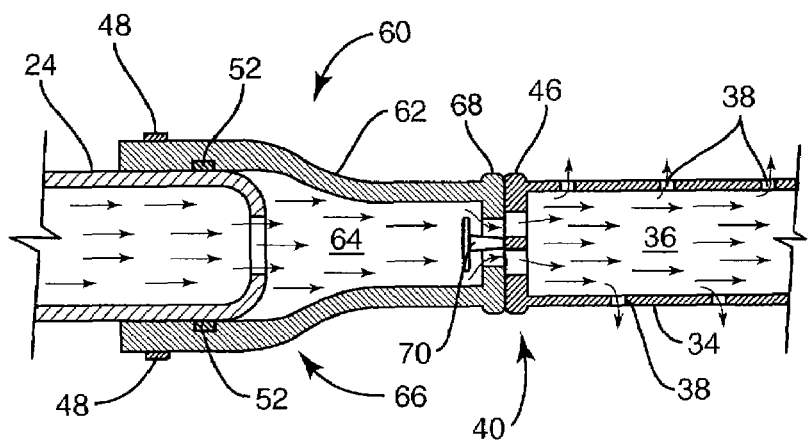

FIGS. 5A-5B show another embodiment in which an intermediate member 60 couples hose 32 to the outlet nozzle 24. In this embodiment, the intermediate member 60 comprises a length of tube. Like hose 32, intermediate member 60 may be flexible, and comprises a sidewall 62 that forms an interior chamber 64. The chamber 64 communicates with the outlet nozzle 24 and the interior chamber 36 of hose 32 to allow generated vapor to pass from the outlet nozzle 24 to the ambient atmosphere via perforations 38.

Intermediate member 60 has a first end 66 that formed to be slightly larger than the outlet nozzle 24 to allow the user to fit the first end 66 over the outlet nozzle 24. A clamp 48 may be used to maintain this connection, while seal 52 may prevent vapor from escaping. The other end of intermediate member 60 includes a valve 68 that releasably connects to the coupling member 46. Valve 68 includes a spring-loaded pin 70 that moves between a sealed position (FIG. 5A) and an open position (FIG. 5B). In this embodiment, pin 70 is biased outwardly away from outlet nozzle 24 into the sealed position such that it seals valve 68. Connecting the valve 68 to coupling member 46, however, pushes pin 70 in the opposite direction to the open position. This opens a passage around and/or through pin 70 such that the generated vapor may pass from the intermediate member 60 into hose 32.

Further, the figures illustrate cap 44 as comprising a cover that substantially seals the terminating end 42 of hose 32. However, there are embodiments where hose 32 is formed with a sealed terminating end 42, and thus, a separate cap 44 may not be needed. Therefore, the present embodiments are to be considered in all respects as illustrative and not restrictive, and all changes coming within the meaning and equivalency range of the appended claims are intended to be embraced therein.

What is claimed is:

1. An accessory for a machine that generates a vapor, the accessory comprising:
   an elongated member; and
   a coupling formed on one end of the elongated member, and comprising an intermediate member configured to releasably interconnect the elongated member to an outlet nozzle of a vapor generator;
   the intermediate member comprising a valve that includes a movable member configured to:
      seal the intermediate member to prevent the generated vapor from escaping when the intermediate member does not interconnect the outlet nozzle to the elongated member; and
      allow the generated vapor to pass into the elongated member when the intermediate member does interconnect the outlet nozzle to the elongated member; and
   one or more perforations formed in a sidewall of the elongated member to emit a vapor generated by the vapor generator, and arranged along the sidewall such that the emitted vapor rises above the elongated member as a curtain of smoke.

2. The accessory of claim 1 wherein the elongated member comprises a flexible hose having an interior chamber configured to receive the generated vapor.

3. The accessory of claim 1 wherein the coupling comprises an open end configured to releasably attach to the outlet nozzle on the vapor generator.

4. The accessory of claim 3 wherein the elongated member comprises a substantially sealed terminating end opposite the open end.

5. The accessory of claim 4 further comprising a cap configured to substantially seal the terminating end of the elongated member.

6. The accessory of claim 1 wherein the elongated member comprises a sidewall.

7. The accessory of claim 6 wherein the perforations are formed as a one or more through holes that extend through the sidewall of the elongated member.

8. The accessory of claim 6 wherein the perforations are formed as one or more elongated slits that extend through the sidewall of the elongated member.

9. The accessory of claim 1 wherein the coupling comprises a seal that seals the elongated member to the outlet nozzle.

10. The accessory of claim 1 wherein the coupling is configured to threadingly engage the outlet nozzle.

11. A vapor generating system comprising:
    a vapor generator to generate a vapor, and comprising an outlet nozzle to expel the generated vapor; and
    an accessory comprising:
       an elongated tube;
       a coupling at a first end of the elongated tube, and comprising an intermediate member configured to releasably interconnect the elongated tube to the outlet nozzle;
       the intermediate member comprising a flexible tube having an interior chamber configured to receive the generated vapor, and including a valve having a movable member configured to:
          prevent the generated vapor from escaping the interior chamber when the intermediate member does not interconnect the outlet nozzle to the elongated tube; and
          allow the generated vapor to pass through the interior chamber and into the elongated tube when the intermediate member does interconnect the outlet nozzle to the elongated tube; and one or more perforations formed in the elongated tube and arranged on the elongated member to emit the generated vapor to rise above the elongated member as a curtain of smoke.

12. The system of claim 11 wherein the elongated tube comprises a flexible hose having a sidewall that defines an interior chamber to receive the generated vapor.

13. The system of claim 12 wherein the one or more perforations comprise one or more through holes that extend through the sidewall, and are configured to allow the vapor to escape from the interior chamber.

14. The system of claim 12 wherein the one or more perforations comprise one or more slits that extend through the sidewall, and are configured to allow the vapor to escape from the interior chamber.

15. The system of claim 11 wherein the coupling is configured to threadingly engage the elongated tube to the outlet nozzle.

* * * * *